US011693461B1

(12) United States Patent
Chen (10) Patent No.: US 11,693,461 B1
(45) Date of Patent: Jul. 4, 2023

(54) MODULE RESET CIRCUIT, RESET UNIT AND SOC RESET ARCHITECTURE

(71) Applicant: Beijing Tenafe Electronic Technology Co., Ltd., Beijing (CN)

(72) Inventor: Zhikai Chen, Shanghai (CN)

(73) Assignee: Beijing Tenafe Electronic Technology Co., Ltd.

( * ) Notice: Subject to any disclaimer, the term of this patent is extended or adjusted under 35 U.S.C. 154(b) by 0 days.

(21) Appl. No.: 17/989,292

(22) Filed: Nov. 17, 2022

(30) Foreign Application Priority Data

Aug. 11, 2022 (CN) .......................... 202210964157.0

(51) Int. Cl.
  *G06F 1/24* (2006.01)
  *G06F 1/08* (2006.01)
  *G06F 1/12* (2006.01)

(52) U.S. Cl.
  CPC .................. *G06F 1/24* (2013.01); *G06F 1/08* (2013.01); *G06F 1/12* (2013.01)

(58) Field of Classification Search
  CPC .................. G06F 1/24; G06F 1/08; G06F 1/12
  USPC ....................................................... 327/142
  See application file for complete search history.

(56) References Cited

U.S. PATENT DOCUMENTS

| 5,680,599 | A | * | 10/1997 | Jaggar | .................. | G06F 11/1441 |
| | | | | | | 714/E11.138 |
| 6,400,195 | B1 | * | 6/2002 | Bhaskaran | ................ | G06F 1/24 |
| | | | | | | 714/E11.005 |
| 6,665,802 | B1 | * | 12/2003 | Ober | ...................... | G06F 1/3203 |
| | | | | | | 713/320 |
| 9,218,029 | B2 | * | 12/2015 | Knight | ........................ | G06F 1/24 |
| 2013/0227257 | A1 | * | 8/2013 | Singh | ......................... | G06F 1/24 |
| | | | | | | 713/1 |

* cited by examiner

*Primary Examiner* — Ryan Jager
(74) *Attorney, Agent, or Firm* — Van Pelt, Yi & James LLP (57) ABSTRACT

A signal receiving circuit receives a reset configuration signal from an exceptional timing sequence device in a functional module and outputs a trigger signal. A first signal generation circuit generates an idle signal based at least in part on the trigger signal. The idle signal is used to configure a shutdown signal which in turn is used to shut down a first clock signal of the exceptional timing sequence device and a second clock signal in a same clock domain as the first clock signal. A second signal generation circuit generates a reset enable signal based at least in part on the trigger signal. An operational circuit performs an operation based at least in part on the reset enable signal and generates a module-based reset signal based at least in part on an operation result. The module-based reset signal is used to reset the exceptional timing sequence device in the functional module.

14 Claims, 7 Drawing Sheets

MODULE RESET CIRCUIT, RESET UNIT AND SOC RESET ARCHITECTURE

CROSS REFERENCE TO OTHER APPLICATIONS

This application is based upon and claims priority to People's Republic of China Patent Application No. 202210964157.0 entitled MODULE RESET CIRCUIT, RESET UNIT AND SOC RESET ARCHITECTURE TECHNICAL FIELD filed Aug. 11, 2022 which is incorporated herein by reference for all purposes.

BACKGROUND OF THE INVENTION

An SoC chip in the related art employs a global-based reset mechanism or a clock domain-based reset mechanism to reset a timing sequence device in the chip, in order to handle various exceptional events during operation. Based on such a reset mechanism, when an exception occurs, it is difficult to determine a clear reset boundary, thus it is difficult for a firmware to handle the exceptional events during operation neatly. A reset operation needs to be performed on the whole chip, resulting in low exception handling efficiency and limited application scenarios of the exception handling mechanism.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a module reset circuit, an apparatus, a storage device and/or a computer SoC reset architecture are described herein (e.g., to overcome low exception handling efficiency and the problems of application scenarios of exception handling mechanisms in the related art).

According to one aspect of the present disclosure, a module reset circuit is provided, which includes: a signal receiving circuit configured to receive a reset configuration signal from an exceptional timing sequence device in a functional module, and output a corresponding trigger signal; a first signal generation circuit electrically connected to the signal receiving circuit, and configured to generate an Idle signal based on the trigger signal, wherein the Idle signal is used to configure a shutdown signal, and the shutdown signal is used to shut down a clock signal of the exceptional timing sequence device and another clock signal in the same clock domain as the clock signal of the exceptional timing sequence device; a second signal generation circuit electrically connected to the signal receiving circuit, and configured to generate a reset enable signal based on the trigger signal; and an operational circuit electrically connected to the second signal generation circuit, and configured to perform an operation based on the reset enable signal, and to generate a module-based reset signal based on an operation result, wherein the module-based reset signal is used to reset the exceptional timing sequence device in the functional module.

In some embodiments of the present disclosure, the signal receiving circuit includes: a synchronization pulse generator configured to receive the reset configuration signal and to configure (e.g., modify) the reset configuration signal as (e.g., to be) a synchronization pulse; and a counter electrically connected to the synchronization pulse generator, and configured to count based on the synchronization pulse, and to output the trigger signal when a counting value reaches a threshold.

In some embodiments of the present disclosure, the first signal generation circuit includes an Idle signal generator, the Idle signal generator is electrically connected to the counter, and is configured to output the Idle signal based on the trigger signal, and wherein the shutdown signal is configured when the Idle signal is at a high level.

In some embodiments of the present disclosure, the second signal generation circuit includes a reset signal generator, the reset signal generator is electrically connected to the counter, and is configured to output the reset enable signal based on the trigger signal.

In some embodiments of the present disclosure, the operational circuit includes a logic AND gate, and the logic AND gate is configured to perform an AND operation on the reset enable signal and a received clock-based reset signal, to generate the module-based reset signal based on the operation result, and wherein a reset operation is performed on the exceptional timing sequence device when the module-based reset signal is at a low level.

In some embodiments of the present disclosure, the module reset circuit further includes: a synchronous reset circuit electrically connected to the reset signal generator or the logic AND gate, and configured to receive the reset enable signal and a clock signal of another clock domain in the functional module, and to generate, based on the reset enable signal and clock signal of the other clock domain, a reset signal for a timing sequence device in the other clock domain in the functional module.

In some embodiments of the present disclosure, the reset configuration signal includes a first reset configuration signal and a second reset configuration signal, the first reset configuration signal is used to reset logic flip-flops and configurable flip-flops, and the second reset configuration signal is used to reset the logic flip-flops.

According to another aspect of the present disclosure, a reset unit is provided, which includes: the module reset circuit according to any of above embodiments, wherein the module reset circuit includes the first signal generation circuit, and the first signal generation circuit is configured to generate the Idle signal; and a clock and reset management module electrically connected to the module reset circuit, wherein the clock and reset management module is configured to receive the Idle signal and to generate the shutdown signal based on the Idle signal, and wherein the shutdown signal is used to shut down the clock signal of the exceptional timing sequence device.

In some embodiments of the present disclosure, the clock and reset management module is further configured to input a clock-based reset signal to the module reset circuit; and the module reset circuit further includes an operational circuit, wherein the operational circuit includes a logic AND gate, and the logic AND gate is configured to perform an AND operation on the reset enable signal and a received clock-based reset signal, to generate the module-based reset signal based on the operation result, and wherein a reset operation is performed on the exceptional timing sequence device when the module-based reset signal is at a low level.

According to another aspect of the present disclosure, a system-on-chip reset architecture is provided, which includes: a system bus; a plurality of processors electrically connected to the system bus; and the reset unit according to above embodiments, wherein the reset unit is electrically connected to the plurality of processors through the system bus.

In some embodiments of the present disclosure, a bus timeout protection module is arranged on the system bus and is electrically connected to the functional module, wherein the bus timeout protection module is configured to generate an artificial or fake response signal when a response from the functional module is not received within a preset time period, and to send the fake response signal to the processor.

In some embodiments of the present disclosure, the system bus includes an AHB bus and an AXI bus, and the bus timeout protection module includes an AHB bus timeout protection module and an AXI bus timeout protection module.

According to embodiments, a module-level reset circuit is provided, through which a reset enable signal inputted to the timing device is generated, so that a module-level reset mechanism can be achieved based on the module-level reset circuit. Based on the module-level reset mechanism, the exceptional timing sequence device in the module can be reset individually. Compared with the traditional clock-based reset mechanism, the module-level reset mechanism can reduce the number of modules being reset during exception handling, and reset exceptional modules more accurately, which is beneficial to reduce the adverse impact of the reset operation on the performance of SoC chips.

In addition, based on the module reset circuit, a shutdown signal is configured based on the Idle signal, that is, all clock signals synchronized with the clock signal of this functional module are shut down during the transition of a module-level reset signal, which is beneficial to solve the problem of asynchronous edge transfer caused by asynchronous reset of part of circuits in the synchronous clock domain, thereby not negatively affecting the timing convergence of complex SoC chips.

For ease of understanding, several terms involved in the present disclosure will be explained first in the following.

SoC (System on Chip, also written as System-on-Chip): the SoC is an integrated circuit with a dedicated target, and contains a complete system and has all the contents of embedded software.

AHB (Advanced High-performance Bus): the AHB is an advanced high-performance bus, and it is a kind of a bus interface.

AXI (Advanced eXtensible Interface): the AXI is an advanced extensible interface, and it is an on-chip bus oriented high performance, high bandwidth and low latency.

System bus: the system bus includes three kinds of buses with different functions, namely data bus DB, address bus AB and control bus CB.

Clock domain: the clock domain refers to region(s) in the circuit controlled by the same clock signal, and in one clock domain, only one clock signal can exist.

FSM (Finite State Machine): the FSM is a mathematical model that represents a finite number of states, and behaviors such as transitions and actions between these states.

The solutions provided by embodiments of the present disclosure involve technologies such as storage, and are specifically described through following embodiments.

Figure 1:
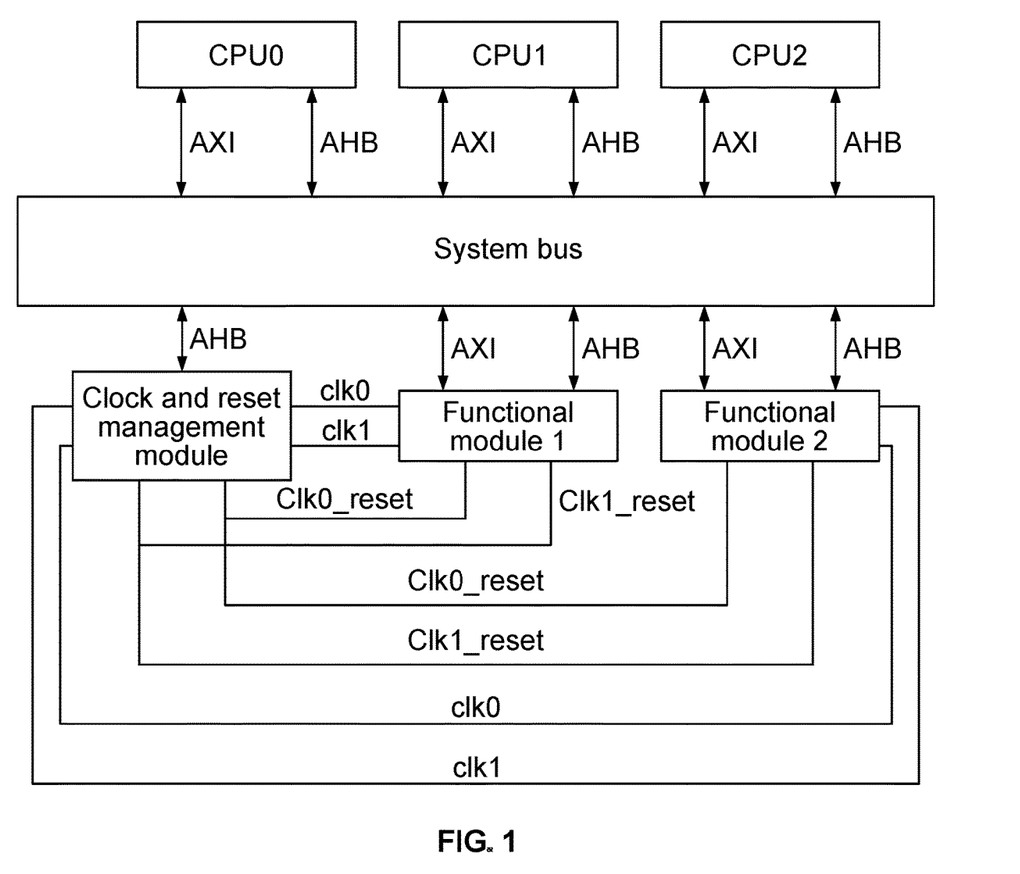
FIG. 1 shows a schematic diagram of an architecture of a System-on-Chip chip according to an embodiment of the present disclosure.

FIG. 1 shows a schematic block diagram of an SoC chip system according to an embodiment of the present disclosure.

As shown in FIG. 1, the SoC chip system may include a system bus (including AXI and AHB), a plurality of CPUs (such as CPU0, CPU1 and CPU2, etc.), a plurality of functional modules (such as a functional module 1 and a functional module 2), and a clock and reset management module. The clock and reset management module is configured to provide clock signals (such as clk0 and clk1) and clock-based reset signals (such as clk0_reset and clk1_reset) to the functional modules. When an exception occurs in the functional module 1, a reset operation based on the clock domain clk0 is required, which causes the functional module 2 also to need to be reset. In some embodiments, a functional module is a hardware module in a SoC chip system that includes a combination of one or more CPUs, one or more hardware modules, and one or more firmware modules which run on the CPUs.

Figure 2:
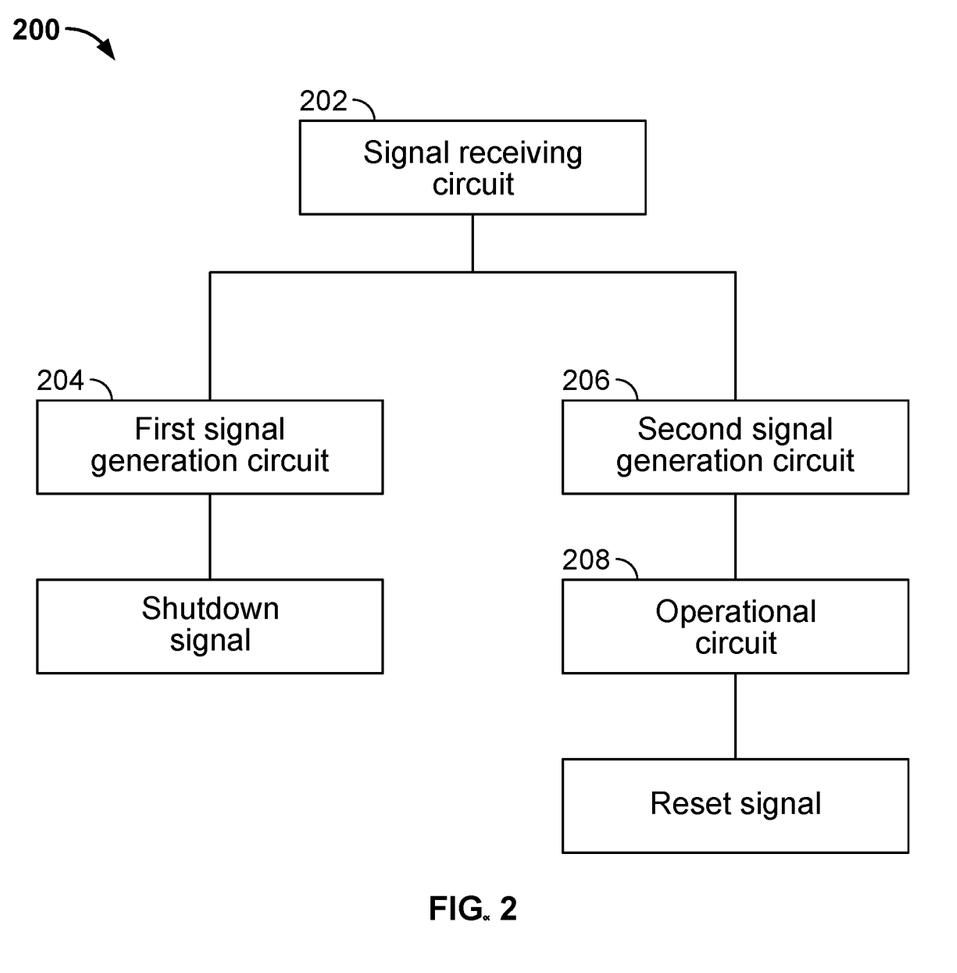
FIG. 2 shows a schematic block diagram of a module reset circuit according to an embodiment of the present disclosure.

FIG. 2 shows a schematic block diagram of a module reset circuit according to an embodiment of the present disclosure, which can be used to realize the reset only for a certain functional module.

As shown in FIG. 2, the module reset circuit 200 according to an embodiment of the present disclosure specifically includes a signal receiving circuit 202, a first signal generation circuit 204, and a second signal generation circuit 206.

The signal receiving circuit 202 is configured to receive a reset configuration signal for an exceptional timing sequence device in the functional module, and output a corresponding trigger signal.

The reset configuration signal for the exceptional timing sequence device in the functional module may be a reset configuration signal sent by a processor. When detecting the exceptional timing sequence device, the processor inputs the reset configuration signal to the signal receiving circuit responsible for resetting the exceptional timing sequence device. The reset configuration signal is processed accordingly to obtain a trigger signal.

In some embodiments, the SoC chip is taken as an example, based on different functions, the functional module may include a power management module, a communication module, a computing module, etc., and a digital circuit module in the computing module is taken as an example, the timing device mainly includes a register and a combinational logic circuit.

The first signal generation circuit 204 is electrically connected to the signal receiving circuit 202, and is configured to generate an Idle signal based on the trigger signal. The Idle signal is used to configure a shutdown signal, which is configured to shut down the clock signal of the exceptional timing sequence device and other clock signals in the same clock domain as the clock signal of the exceptional timing sequence device.

The first signal generation circuit 204 is configured to generate the Idle signal based on the trigger signal received. The Idle signal is a state signal that switches from a low level state to a high level state. The Idle signal is outputted to a management module for the clock signal, for example, the clock and reset management module described in the following. The management module controls to shut down the clock signal of the exceptional timing sequence device and other clock signals in the same clock domain as the clock signal of the exceptional timing sequence device, i.e., all clock signals in this clock domain. In this way, the clock signals of other functional modules in the same clock domain as the functional module can be shut down. Since no clock signals are transmitted to other functional modules, no problems arise even if other functional modules receive asynchronous signals, which allows for no additional timing convergence burden to be placed on the SoC chip.

The second signal generation circuit 206 is electrically connected to the signal receiving circuit 202, and is configured to generate a reset enable signal based on the trigger signal.

The second signal generation circuit 206 can generate a corresponding reset enable signal based on the trigger signal received.

An operational circuit 208 is electrically connected to the second signal generation circuit 206, and is configured to perform an operation based on the reset enable signal, and generate a module-based reset signal for the functional module based on an operation result. The module-based reset signal can be used to reset the exceptional timing sequence device in the functional module.

It can be understood by those skilled in the art that, in the circuits mentioned above, in addition to the first signal generation circuit for generating the Idle signal, the number of other circuits may correspond to the number of groups of timing devices that need to be restored. For example, for the functional module including two groups of timing sequence devices, two signal receiving circuits, two second signal generation circuits and two operational circuits are provided accordingly.

According to embodiments, a module-level reset circuit is provided, through which a reset enable signal inputted to the timing device is generated, so that a module-level reset mechanism can be achieved based on the module-level reset circuit. Based on the module-level reset mechanism, the exceptional timing sequence device in the module can be reset individually. Compared with the traditional clock-based reset mechanism, the module-level reset mechanism can reduce the number of modules being reset during exception handling, and reset exceptional modules more accurately, which is beneficial to reduce the adverse impact of the reset operation on the performance of SoC chips.

In addition, based on the module reset circuit, a shutdown signal is configured based on the Idle signal, that is, all clock signals synchronized with the clock signal of this functional module are shut down during the transition of a module-level reset signal, which is beneficial to solve the problem of asynchronous edge transfer caused by asynchronous reset of part of circuits in the synchronous clock domain, thereby not negatively affecting the timing convergence of complex SoC chips.

Figure 3:
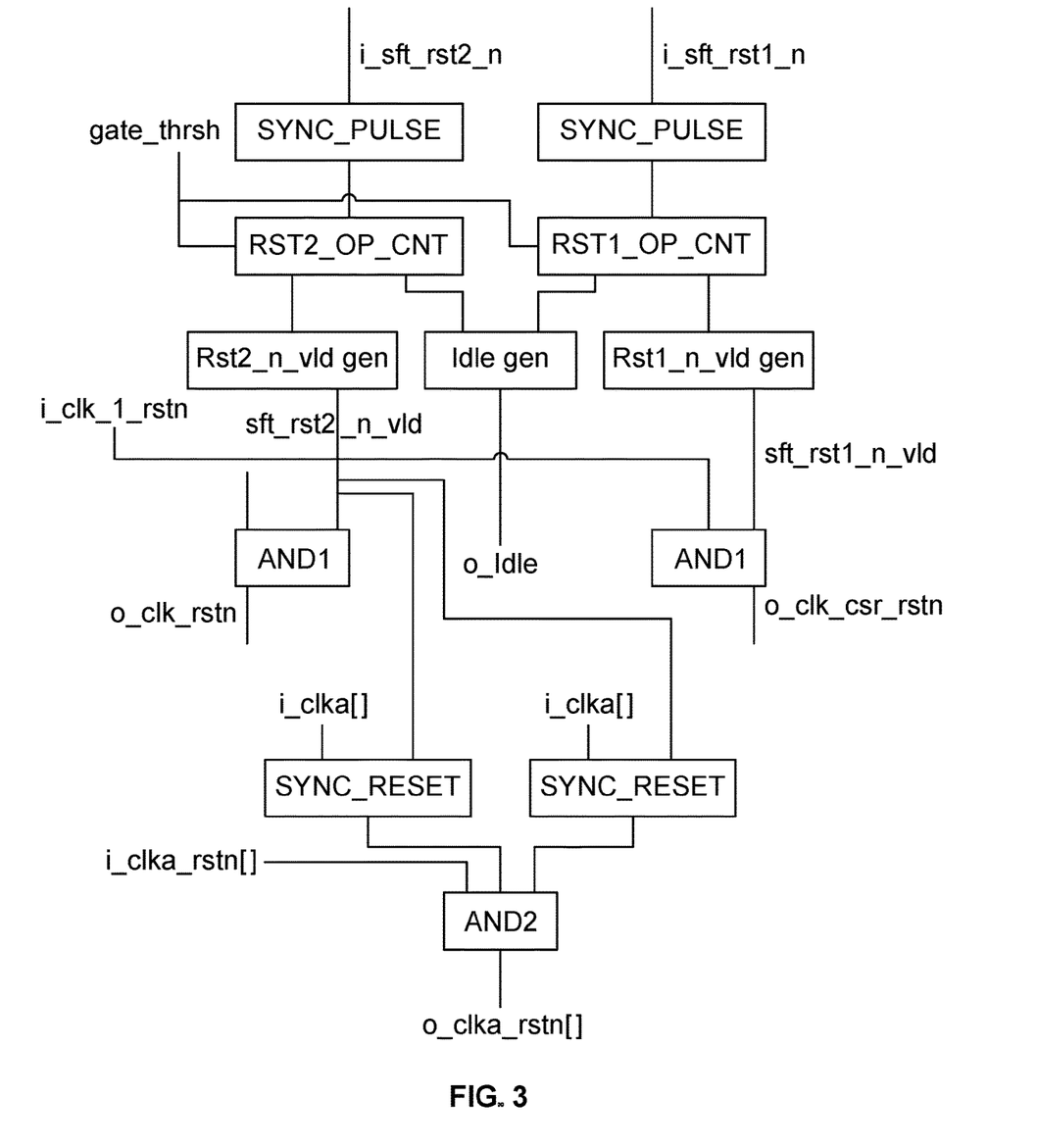
FIG. 3 shows a schematic circuit diagram of a module reset circuit according to an embodiment of the present disclosure.

As shown in FIG. 3, in some embodiments of the present disclosure, the signal receiving circuit 202 includes a synchronization pulse generator and a counter.

The synchronization pulse generator SYNC_PULSE is configured to receive the reset configuration signal, and configure the reset configuration signal as a synchronization pulse.

The synchronization pulse generator SYNC_PULSE can ensure the consistency between sending and receiving ends of the reset circuit.

The counter (RST1_OP_CNT and RST2_OP_CNT) is electrically connected to the synchronization pulse generator, and is configured to count based on the synchronization pulse, and output a trigger signal when a counting value reaches a threshold.

As shown in FIG. 3, the counter is further configured to receive an externally input counting threshold gate_thrsh. The synchronization pulse is counted through the counter, and when it is detected that the counting value reaches the counting threshold, a corresponding trigger signal is output, to trigger the execution of the reset operation.

According to embodiments, it is beneficial to ensure the timeliness and reliability of the trigger signal outputted by the signal receiving circuit by providing the synchronization pulse generator and the counter in the signal receiving module.

As shown in FIG. 3, in some embodiments of the present disclosure, the first signal generation circuit includes an Idle signal generator Idle gen. The Idle signal generator Idle gen is electrically connected to the counter, and is configured to output an Idle signal based on the trigger signal. In some embodiments, a shutdown signal is configured when the Idle signal is at a high level.

The Idle signal generator is specifically a device capable of pulling a low level to a high level.

In some embodiments, the Idle signal generator is configured to generate a high-level Idle signal in response to the trigger signal, and the Idle signal is input into the management module for managing the functional module, so that the management module can generate based on the Idle signal, the shutdown signal, which is used to shut down the clock signals in the synchronous clock domain, to avoid the asynchronous reset of some circuits and asynchronous edge transfer caused by asynchronous reset.

In some embodiments, when the reset operation is active or inactive, other clocks in the same clock domain are disabled based on the shutdown signal, which can make it easy for the SoC to shut down the reset timing without additional cost. In some implementations, a clock and reset management module connected to the module reset circuit can be used to generate the shutdown signal based on the Idle signal, to disable other clocks in the same clock domain based on the shutdown signal.

As shown in FIG. 3, in some embodiments of the present disclosure, the second signal generation circuit includes a reset signal generator (Rst1_$n$_vld gen and Rst2_$n$_vld gen). Different reset signal generators are configured to respectively generate corresponding reset enable signals based on different trigger signals. The reset signal generator is electrically connected to the counter, and is configured to output the reset enable signal based on the trigger signal.

According to embodiments, the reset signal generator is used as the second signal generation circuit, so that the reset enable signal generated by the reset signal generator can ensure the pertinence to the exceptional timing sequence device during the reset operation, thereby reducing adverse impacts on other functional modules from the reset operation of current functional module.

As shown in FIG. 3, in some embodiments of the present disclosure, the operational circuit includes a first logic AND gate AND1. The first logic AND gate AND1 is configured to perform an AND operation on the reset enable signal and a clock-based reset signal received, to generate a module-based reset signal based on an operation result. When the module-based reset signal is at a low level, the exceptional timing sequence device performs a reset operation.

In some embodiments, the AND operation can be performed on the reset enable signal and the received clock-based reset signal through the first logic AND gate, so that when both signals indicate the reset operation, the module-based reset signal can be obtained. The module-based reset signal can ensure that the timing sequence device in current module is reset, so that it is not necessary to reset multiple functional modules in the same clock domain, and based on the reset signal, the timing device can be restored to a normal state from an error state.

In some embodiments of the present disclosure, a synchronous reset circuit is further included. The synchronous reset circuit is electrically connected to the reset signal generator or the logic AND gate, and is configured to receive the reset enable signal and clock signals in other clock domains in the functional module, and to generate reset signals for timing sequence devices of other clock domains in the functional module based on the reset enable signal and the clock signals in other clock domains.

As shown in FIG. 3, the synchronous reset circuit includes a synchronous reset processor SYNC_RESET and a second logic AND gate AND2. The synchronous reset processor SYNC_RESET receives the reset enable signal outputted by the reset signal generator and the clock signals of corresponding clock domains. Based on the reset enable signal and the clock signals of corresponding clock domains, reset enable signals corresponding to other clock domains used in the functional module can be generated. The reset enable signals are used in combination with a clock-based reset signal i_clka_rstn[ ] inputted, so as to realize the reset of the timing sequence device driven by a clock signal i_clka[ ], thereby realizing the reset of the timing sequence devices in the whole functional module.

Herein, a figure in "[ ]" represents the number of clock signals belonging to different clock domains.

As shown in FIG. 3, in some embodiments of the present disclosure, the reset configuration signal includes a first reset configuration signal i_sft_rst1_$n$ and a second reset configuration signal i_sft_rst2_$n$. The first reset configuration signal is used to reset a logic flip-flop and a configurable flip-flop. The second reset configuration signal is used to reset the logic flip-flop.

In some embodiments, above two reset configuration signals are inputted, the first reset configuration signal is used to generate a module-based reset signal o_clk_csr_rstn, to reset all logic flip-flops and configurable flip-flops in the module, and the second reset configuration signal is used to generate a module-based reset signal o_clk_rstn, to reset all logic flip-flops in the block. Since the reset of the configurable flip-flop requires re-initialization performed by the processor, the reset of the configurable flip-flop is time-consuming, therefore whether to reset the configurable flip-flops can be determined according to operating conditions. If only the logic flip-flops need to be reset, only the first reset configuration signal is required to be input. If all the logic flip-flops and configurable flip-flops need to be reset, the first reset configuration signal and the second reset configuration signal are required to be input.

Figure 4:
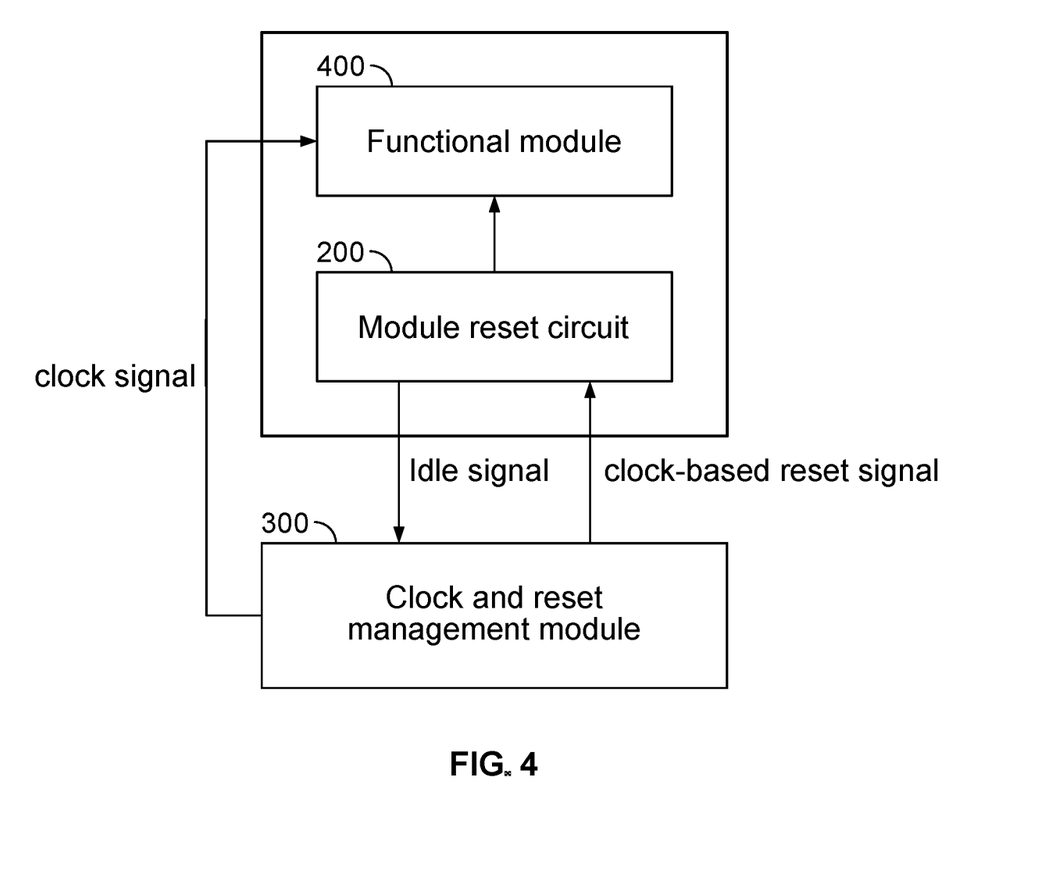
FIG. 4 shows a timing signal diagram of a module reset circuit according to an embodiment of the present disclosure.

As shown in FIG. 4, a reset unit according to an embodiment of the present disclosure includes the module reset circuit 200 according to any of above embodiments. The module reset circuit includes the first signal generation circuit 204, and the first signal generation circuit can be configured to generate the Idle signal.

A clock and reset management module 300 is electrically connected to the module reset circuit 200. The clock and reset management module 300 is configured to receive the Idle signal, and to generate a shutdown signal based on the Idle signal. The shutdown signal is used to shut down the clock signal of the exceptional timing sequence device.

The clock and reset management module 300 is responsible for generating clock signals and clock-based reset signals for each module.

The clock and reset management module 300 is configured to generate the clock-based reset signals. It is assumed that a functional module 400 has two clock signals clk0 and clk1, then two clock-based reset signals are required accordingly. That is, a signal clk0_rstn is used to manage the reset of the timing sequence devices under clk0, a signal clk1_rstn is used to manage the reset of all timing sequence devices under clk1.

The module-level reset can be realized by providing the module reset circuit 200 and by combining the module reset circuit 200 with the clock-based reset signal sent by the clock and reset management module 300. The devices can be reset, regardless of whether the devices are under clock0 or clock1, as long as they belong to the same functional module.

Further, the signal is inputted to the clock and reset management module, the clock and reset management module shuts down the clock signal i_clk based on the signal o_Idle.

In some embodiments, the module-level reset circuit and the clock and reset management module are provided, and the reset enable signal inputted to the timing sequence device is generated, so as to perform a module-level reset mechanism based on the module-level reset circuit. The exceptional timing sequence devices in the module can be reset independently based on the module-level reset mechanism. Compared with the traditional clock-based reset mechanism, the module-level reset mechanism can reduce the number of modules being reset during exception handling, and reset exceptional modules more accurately, which is beneficial to reduce the adverse impact of the reset operation on the performance of SoC chips.

In addition, embodiments provide the module reset circuit, the Idle signal is sent to the clock and reset management module, and the clock and reset management module configures the shutdown signal for the clock signal. That is, all clock signals synchronized with the clock of the functional module are shut down during transition of the module-level reset signal, which is beneficial to solve the problem of asynchronous edge transfer caused by asynchronous reset of part of circuits in the synchronous clock domain, thereby not negatively affecting the timing convergence of complex SoC chips.

In some embodiments of the present disclosure, the clock and reset management module 300 is further configured to input a clock-based reset signal to the module reset circuit. The module reset circuit further includes an operational circuit, the operational circuit includes a logic AND gate, and the logic AND gate is configured to perform an AND operation on the reset enable signal and the received clock-based reset signal to generate a module-based reset signal based on an operation result. Herein, when the module-based reset signal is at a low level, the reset operation is performed on the exceptional timing sequence device.

According to embodiments, the clock and reset management module operates in cooperation with the reset circuit, so that the reset of the timing sequence devices in the module is realized.

Figure 5:
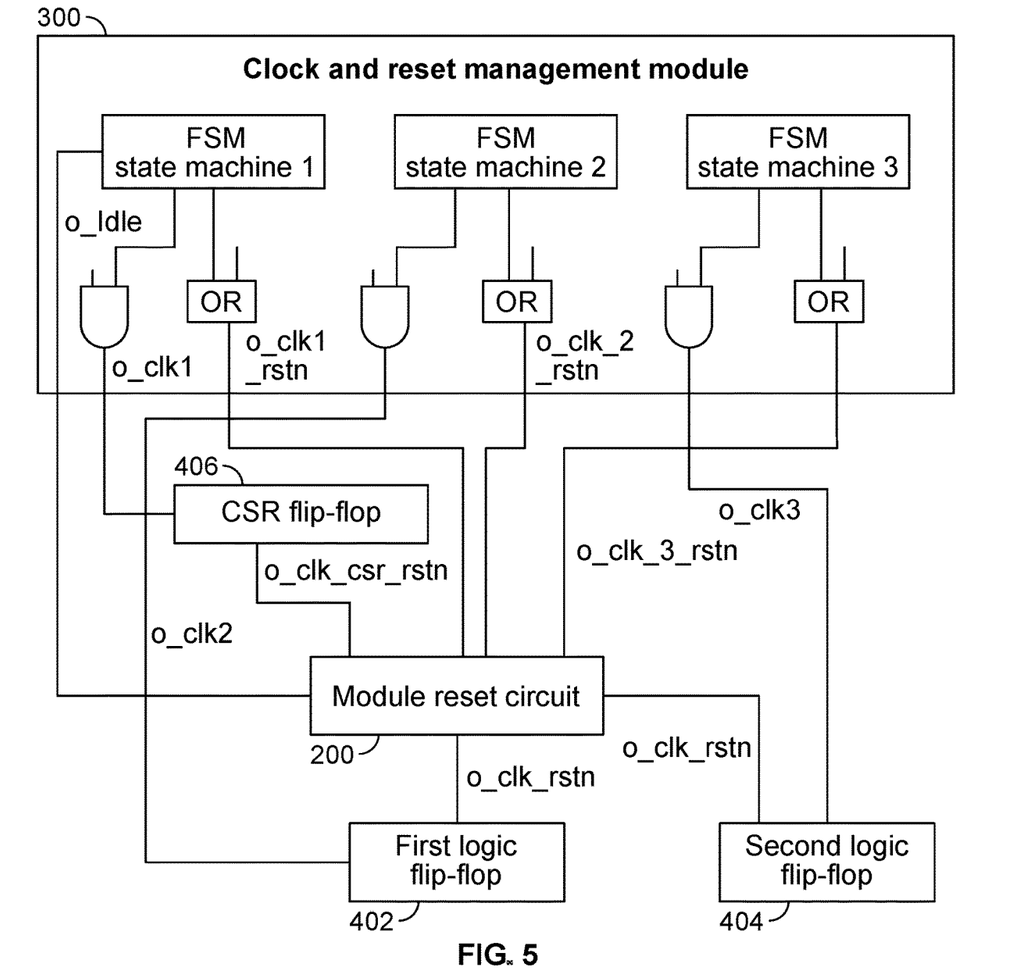
FIG. 5 shows a schematic diagram of a reset unit according to an embodiment of the present disclosure.

As shown in FIG. 5, the clock and reset management module 300 includes a plurality of FSM state machines, such as FSM state machine 1, FSM state machine 2 and FSM state machine 3. Based on each FSM state machine and the corresponding logic operational circuit, a clock signal and a clock-based reset signal in one clock domain is outputted correspondingly.

Based on the management characteristics of the clock and reset management module 300, reset signals of all functional modules can be managed.

As shown in FIG. 5, FSM state machine 1 outputs clock signal o_clk1 and clock-based recovery signal o_clk_1_rstn, FSM state machine 2 outputs clock signal o_clk2 and clock-based recovery signal o_clk_2_rstn, and FSM state machine 3 outputs clock signal o_clk3 and clock-based recovery signal o_clk_3_rstn. The signals o_clk1 is used to drive a CSR flip-flop 406, o_clk2 is used to drive a first logic flip-flop 402, and o_clk3 is used to drive a second logic flip-flop 404.

When the reset is required based on an exception, the module reset circuit 200 sends a signal o_Idle to the clock and reset module 300. Based on the recovery signal o_clk_1_rstn, the recovery signal o_clk_2_rstn and the recovery signal o_clk_3_rstn, in combination with the module-based reset signal generated by the module reset circuit 200, all other clocks in the same clock domain can be shut down, and the reset signal is pulled down to realize the reset of the flip-flops in the entire functional module.

Figure 6:
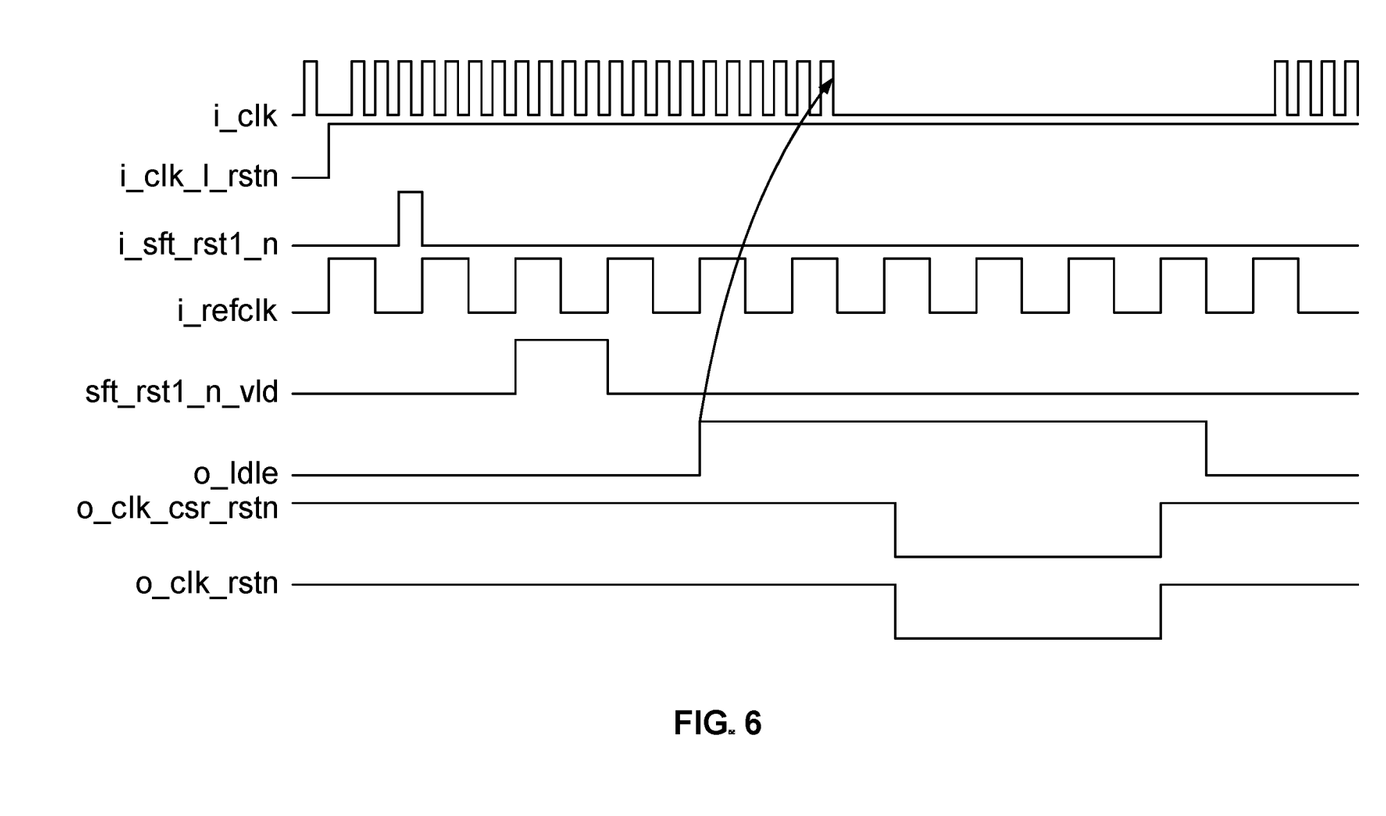
FIG. 6 shows a schematic circuit diagram of a reset unit according to an embodiment of the present disclosure.

As shown in FIG. 6, i_clk is the clock signal the clock and reset management module inputs to the functional module. The reset circuit receives the reset configuration signal i_sft_rst1_n sent by the processor, pulls the Idle signal o_Idle high, and sends the pulled Idle signal to the clock and reset management module. Based on an indication line from o_Idle to i_clk in FIG. 6, the clock and reset management module shuts down the clock signal i_clk in advance based on the Idle signal, that is, i_clk enters a low-level state. The signal i_clk_1_rstn is inputted to the module reset circuit, and an AND operation is performed on sft_rst1_n_vld and i_clk_1_rstn, to obtain the reset signals o_clk_csr_rstn and o_clk_rstn active at low level, so as to realize the reset of the logic flip-flops and the configurable flip-flops in the functional module.

Figure 7:
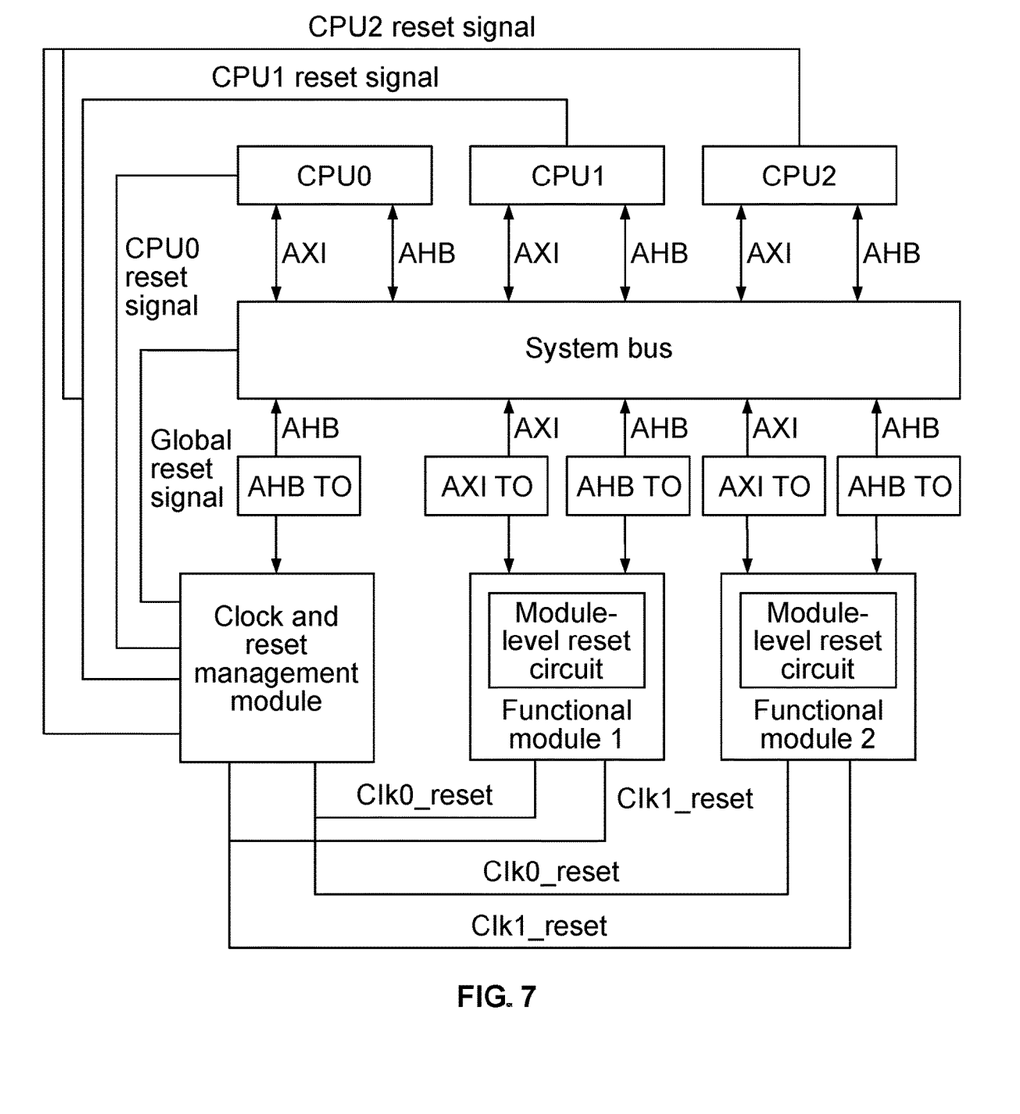
FIG. 7 shows a schematic diagram of a reset architecture of a System-on-Chip chip according to an embodiment of the present disclosure.

As shown in FIG. 7, a system-on-chip reset architecture according to an embodiment of the present disclosure includes a bus and a plurality of processors CPUs.

The plurality of processors CPUs are electrically connected to the bus.

In some embodiments, the CPU communicates with other modules only through the system bus (AHB or AXI), and the system bus and the CPU can be isolated from other modules through AHB TO and AXI TO blocks.

The reset unit described in above-mentioned embodiments is electrically connected to the plurality of processors through the bus.

As shown in FIG. 7, the clock and reset management module can provide clock-based reset signals Clk0_reset and Clk1_reset (i.e., the o_clk_1_rstn mentioned above) in different clock domains. The module-level reset circuits in different functional module 1 and functional module 2 can receive Clk0_reset and Clk1_reset respectively.

In embodiments of the present disclosure, the reset unit is provided, so that the reset function in the module-based system in the system-on-chip SOC chip can be realized.

In some embodiments of the present disclosure, a bus timeout protection module is provided on the bus and is electrically connected to the functional module. The bus timeout protection module is configured to generate a fake response signal when no response from the functional module is received within a preset time period, and send the fake response signal to the processor.

The fake response signal can be understood as a response signal outputted by a non-functional module and can be used to respond to an instruction of the processor.

In some embodiments, the architecture of the SoC chip includes a processor CPU, a system bus, and a functional module. If a problem occurs in the system bus, it will affect all processor CPUs in the chip. In embodiments, a bus timeout protection module is provided, and the bus timeout protection module is electrically connected to the module reset circuit in the reset unit, to wait for the response from the functional module. If no response is received within a specified time period, a fake response can be generated, so that the CPU will not wait for the response all the time, so as to ensure that the CPU can be in a normal operating state. The exception is isolated from the system bus through the bus timeout protection module, which can ensure that the exceptional module will not affect the system bus and CPU, thereby reducing the adverse impact of the exceptional handling on performance.

As shown in FIG. 7, in some embodiments of the present disclosure, the bus includes the AHB bus and the AXI bus.

The bus timeout protection module includes an AHB bus timeout protection module and an AXI bus timeout protection module.

As shown in FIG. 7, AHB TO is the AHB bus timeout protection module. When the AHB operation exceeds a set time and is not completed, AHB TO can replace the AHB slave device to complete the AHB operation, so that the CPU can end the current AHB operation normally.

As shown in FIG. 7, AXI TO is the AXI bus timeout protection module. When the AXI operation (including operations of 5 AXI channels) exceeds a set time and is not completed, AXI TO can replace the AXI slave device to complete the current AXI operation, so that the CPU can end the current AXI operation normally.

In some embodiments, the clock and reset management module is responsible for generating two reset signals, which can respectively reset the logic flip-flops in the functional module, or reset the logic flip-flops and the configurable flip-flops in the module.

In some embodiments, according to solutions of the present disclosure, the bus protection function and the module-level reset mechanism can ensure that the exceptional module will not affect the system bus and CPU, and the module-level reset mechanism can reset the exceptional module more accurately, thereby reducing the adverse impact on the performance of exception handling.

As shown in FIG. 7, based on the reset architecture of the SoC of the present disclosure, the following functions can be implemented.

(1) A global reset signal is generated based on the clock and reset management module, and a clock domain base reset function and a chip-level global reset function can be provided.

Specifically, by providing the clock domain base reset function and the chip-level global reset function, and through the chip-level global reset, intermediate states and many necessary configurations will become clear. Although a large reset cost will be resulted, advantages can be obtained, where a global reset can have a clear state and that the silicon can go back to the initial state of power boot can be easily guaranteed. The clock domain base reset can provide a cross-block reset, which will make all flip-flops have the same clock.

(2) System bus timeout mechanism.

As shown in FIG. 7, by providing the bus timeout protection modules AHB TO and AXI TO, the adverse impact of module-level errors on the system bus and CPU can be isolated. Without this mechanism, the module-level errors are likely to cause the system bus or the CPU to hang, thereby making the CPU has no chance to pull the module back to a normal state.

(3) An individual reset mechanism is provided for each CPU core.

As shown in FIG. 7, different CPU reset signals are generated by the clock and reset management module, and each CPU core provides a rate reset mechanism. Through this mechanism, as long as the SoC chip has one CPU core active, the SoC will have the ability to pull the CPU core back from the exceptional state.

(4) Module-level reset mechanism.

The module-level reset mechanism is realized by combining the module-level reset circuit and the clock and reset management module. The module-level reset mechanism enables a clear reset boundary to be maintained, which provides a way to maintain minimal impact when the firmware is reset due to error handling. The module-level reset scheme in the present disclosure provides two reset modes, the first is to reset only the logic flip-flops in the module, and the second is to reset the logic flip-flops and configurable flip-flops in the module.

As will be appreciated by those skilled in the art, various aspects of the present disclosure may be embodied as a system, a method or a program product. Therefore, various aspects of the present disclosure may be embodied in the following forms, namely a complete hardware implementation, a complete software implementation (including firmware, microcode, etc.), or a combination of hardware and software, which may be collectively referred to herein as implementations "circuit", "module", or "system".

According to the module reset circuit, reset unit and system-on-chip reset architecture provided by the present disclosure, the module-level reset circuit and the clock and reset management module are provided, and the reset enable signal inputted to the timing sequence device is generated, so as to perform a module-level reset mechanism based on the module-level reset circuit. The exceptional timing sequence devices in the module can be reset independently based on the module-level reset mechanism. Compared with the traditional clock-based reset mechanism, the module-level reset mechanism can reduce the number of modules being reset during exception handling, and reset exceptional modules more accurately, which is beneficial to reduce the adverse impact of the reset operation on the performance of SoC chips.

In addition, based on the module reset circuit, a shutdown signal is configured based on the Idle signal, that is, all clock signals synchronized with the clock signal of this functional module are shut down during the transition of a module-level reset signal, which is beneficial to solve the problem of asynchronous edge transfer caused by asynchronous reset of part of circuits in the synchronous clock domain, thereby not negatively affecting the timing convergence of complex SoC chips.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a signal receiving circuit that is configured to:
   receive a reset configuration signal from an exceptional timing sequence device in a functional module; and
   output a trigger signal;
   a first signal generation circuit that is:
   electrically connected to the signal receiving circuit; and
   configured to generate an idle signal based at least in part on the trigger signal, wherein:
   the idle signal is used to configure a shutdown signal; and
   the shutdown signal is used to shut down a first clock signal of the exceptional timing sequence device and a second clock signal in a same clock domain as the first clock signal of the exceptional timing sequence device;
   a second signal generation circuit that is:
   electrically connected to the signal receiving circuit; and
   configured to generate a reset enable signal based at least in part on the trigger signal; and
   an operational circuit that is:
   electrically connected to the second signal generation circuit;
   configured to perform an operation based at least in part on the reset enable signal; and
   configured to generate a module-based reset signal based at least in part on an operation result, wherein the module-based reset signal is used to reset the exceptional timing sequence device in the functional module.

2. The system recited in claim 1, wherein the signal receiving circuit comprises:
a synchronization pulse generator that is configured to:
receive the reset configuration signal; and
modify the reset configuration signal to be a synchronization pulse; and
a counter that is:
electrically connected to the synchronization pulse generator;
configured to count based at least in part on the synchronization pulse; and
output the trigger signal when a counting value reaches a threshold.

3. The system recited in claim 2, wherein:
the first signal generation circuit comprises an idle signal generator;
the idle signal generator is electrically connected to the counter and is configured to output the idle signal based at least in part on the trigger signal; and
the shutdown signal is configured when the idle signal is at a high level.

4. The system recited in claim 2, wherein:
the second signal generation circuit comprises a reset signal generator; and
the reset signal generator is electrically connected to the counter and is configured to output the reset enable signal based on the trigger signal.

5. The system recited in claim 4, wherein:
the operational circuit comprises a logic AND gate;
the logic AND gate is configured to perform an AND operation on the reset enable signal and a received clock-based reset signal to generate the module-based reset signal based on the operation result, and
a reset operation is performed on the exceptional timing sequence device when the module-based reset signal is at a low level.

6. The system recited in claim 5, further comprising a synchronous reset circuit that is:
electrically connected to at least one of the reset signal generator or the logic AND gate;
configured to receive the reset enable signal and a clock signal of another clock domain in the functional module; and
configured to generate, based at least in part on the reset enable signal and the clock signal of said another clock domain, a reset signal for a timing sequence device in said another clock domain in the functional module.

7. The system recited in claim 1, wherein:
the system recited in claim 1 is electrically connected to a plurality of processors through a system bus; and
the system recited in claim 1 further includes a bus timeout protection module electrically connected to the system bus and electrically connected to the functional module; and
the bus timeout protection module is configured to generate an artificial response signal when a response from the functional module is not received within a preset time period, and to send the artificial response signal to at least one of the plurality of processors.

8. A method, comprising:
receiving, at a signal receiving circuit, a reset configuration signal from an exceptional timing sequence device in a functional module;
outputting, by the signal receiving circuit, a trigger signal;

generating, at a first signal generation circuit that is electrically connected to the signal receiving circuit, an idle signal based at least in part on the trigger signal, wherein:
the idle signal is used to configure a shutdown signal; and
the shutdown signal is used to shut down a first clock signal of the exceptional timing sequence device and a second clock signal in a same clock domain as the first clock signal of the exceptional timing sequence device;
generating, at a second signal generation circuit that is electrically connected to the signal receiving circuit, a reset enable signal based at least in part on the trigger signal;
performing, at an operational circuit that is electrically connected to the second signal generation circuit, an operation based at least in part on the reset enable signal; and
generating, at the operational circuit, a module-based reset signal based at least in part on an operation result, wherein the module-based reset signal is used to reset the exceptional timing sequence device in the functional module.

9. The method recited in claim 8, further including:
using a synchronization pulse generator included in the signal receiving circuit to:
receive the reset configuration signal; and
modify the reset configuration signal to be a synchronization pulse; and
using a counter included in the signal receiving circuit and electrically connected to the synchronization pulse generator to:
count based at least in part on the synchronization pulse; and
output the trigger signal when a counting value reaches a threshold.

10. The method recited in claim 9, wherein:
the first signal generation circuit comprises an idle signal generator;
the idle signal generator is electrically connected to the counter and is configured to output the idle signal based at least in part on the trigger signal; and
the shutdown signal is configured when the idle signal is at a high level.

11. The method recited in claim 9, wherein:
the second signal generation circuit comprises a reset signal generator; and
the reset signal generator is electrically connected to the counter and is configured to output the reset enable signal based on the trigger signal.

12. The method recited in claim 11, wherein:
the operational circuit comprises a logic AND gate;
the logic AND gate is configured to perform an AND operation on the reset enable signal and a received clock-based reset signal to generate the module-based reset signal based on the operation result, and
a reset operation is performed on the exceptional timing sequence device when the module-based reset signal is at a low level.

13. The method recited in claim 12, further comprising using a synchronous reset circuit that is electrically connected to at least one of the reset signal generator or the logic AND gate to:
receive the reset enable signal and a clock signal of another clock domain in the functional module; and generate, based at least in part on the reset enable signal and the clock signal of said another clock domain, a reset signal for a timing sequence device in said another clock domain in the functional module.

14. The method recited in claim 8, wherein:

there is a plurality of processors electrically connected to a system bus; and the method recited in claim 8 further includes using a bus timeout protection module electrically connected to the system bus and electrically connected to the functional module to generate an artificial response signal when a response from the functional module is not received within a preset time period, and to send the artificial response signal to at least one of the plurality of processors.

* * * * *